United States Patent [19]

Muller

[11] 3,948,778

[45] Apr. 6, 1976

[54] FILTER APPARATUS

[76] Inventor: Hans Müller, Alte Landstrasse 415, 8708 Mannedorf, Switzerland

[22] Filed: July 17, 1974

[21] Appl. No.: 489,422

[30] Foreign Application Priority Data

July 19, 1973 Switzerland ........................ 10615/73

[52] U.S. Cl. .................. 210/330; 210/344; 210/345

[51] Int. Cl.[2] ........................................... B01D 33/02

[58] Field of Search ............. 210/66, 324, 325, 330, 210/333, 354, 360, 367, 344, 345, 380, 393, 455, 488

[56] References Cited

UNITED STATES PATENTS

| | | | |
|---|---|---|---|
| 815,239 | 3/1906 | Walker | 210/335 X |
| 1,902,982 | 3/1933 | Abbott | 210/380 X |
| 3,251,469 | 5/1966 | Muller | 210/66 |
| 3,387,711 | 6/1968 | Rickert | 210/345 X |
| 3,481,480 | 12/1969 | Schwinghammer | 210/488 |
| 3,647,084 | 3/1972 | Martin | 210/488 |
| 3,693,803 | 9/1972 | Guazzone | 210/330 |

*Primary Examiner*—Theodore A. Granger
*Attorney, Agent, or Firm*—Michael J. Striker

[57] ABSTRACT

In a filter apparatus of the type having a receptacle and an upright hollow shaft which is rotatable in the receptacle, a plurality of substantially horizontal filter elements are mounted on the shaft axially spaced thereon and rotatable with the shaft. Each of the filter elements includes a plate member which is imperforate and a filter cloth which overlies an upwardly facing side of the plate member. Spacers are located between each pair of adjacent filter elements, and each spacer includes a ring portion which surrounds the shaft and spaces the adjacent filter elements from one another, and a plurality of spoke portions which extend outwardly from the ring portion and of which each has an upper edge engaging a downwardly facing side of the plate member of the upper filter element of the pair, and a lower edge engaging the filter cloth on the lower filter element of the pair, in order to hold the filter cloth against the associated plate member.

10 Claims, 5 Drawing Figures

FILTER APPARATUS

BACKGROUND OF THE INVENTION

The present invention relates generally to a filter apparatus, and more particularly to a filter apparatus having substantially horizontal filter elements of plate-like configuration which are rotatable about an upright axis in order to centrifugally discharge filtered-out residue that has accumulated on them.

Filter apparatus of this type is known per se, for instance from my U.S. Pat. No. 3,251,468 and from my Swiss Pat. No. 369,747. This type of filter apparatus usually uses for each filter element an imperforate plate member which projects transversely of an upright rotatable shaft which is hollow, and a filter cloth overlying the upwardly facing side of the plate member. The liquid then filters through the filter cloth and runs beneath the same on the surface of the plate member towards the shaft, for which purpose the plate member is slightly dished so as to be inclined inwardly towards the shaft. The shaft itself is provided with perforations through which the liquid then can run into the interior of the shaft, which is hollow and from where the liquid runs off for further use. The filtered-out residue forms a filter cake on the surface of the filter cloth, and when the cake formation has progressed to a certain extent, for instance to the empirically determined point at which filtration is no longer adequate because of clogging of the filter cloth, filtration is stopped and the shaft and filter elements which heretofore have been stationary, are rotated at relatively high speed so that the filter cake is flung off the surface of the filter cloths under the influence of centrifugal force.

Subsequent to the centrifugal ejection of the filter cake, the filter elements are subjected to a back-flushing operation, in that liquid for cleaning purposes is made to pass through the filter elements, or rather particularly through the filter cloths, while the rotation still continues, so as to remove any residual filtered-out matter from the cloth.

During this back-flushing operation the filter cloth exhibits a tendency to move off the underlying plate member of the filter element; this can lead to damage to the filter cloth or at the very least to deformations in the filter cloth which during the nextfollowing filtering cycle will disadvantageously influence the filtering capability. It is known for this reason to provide on a spacer ring which surrounds the shaft intermediate the adjacent filter elements, a plurality of rod-shaped fingers or projections which extend outwardly from the spacer ring and are intended to hold the filter cloth down against the associated plate member. However, experience has shown that in many circumstances, particularly if the filtered-out matter tends to cling to the filter cloth, a deformation of these rod-shaped fingers takes place, causing the same to bend irreversibly so that they no longer hold the filter cloth properly against the plate member during the back-flushing operation and subsequently during the next-following filtering operation.

SUMMARY OF THE INVENTION

Since this is disadvantageous, it is an object of the present invention to avoid the aforementioned problem. More particularly, it is an object of the present invention to provide an improved filter apparatus of the type under discussion, wherein the filter cloth of the respective filter elements will be reliably held against movement away from the filter plate member of the respective element.

In keeping with these objects, and with others which will become apparent hereafter, one feature of the invention resides in a filter apparatus of the type having a receptacle and an upright hollow shaft which is rotatable in this receptacle. In this apparatus the invention provides for a plurality of substantially horizontal filter elements mounted on the shaft axially spaced thereon and rotatable therewith. Each of the filter elements includes a plate member and a filter cloth which overlies an upwardly facing side of the plate member. Spacing means is located between each pair of adjacent filter elements and includes a ring portion surrounding the shaft and a plurality of spoke portions extending outwardly from the ring portion and each having an upper edge engaging a downwardly facing side of the plate member of the upper filter element of the pair, and a lower edge engaging the filter cloth on the lower filter element of the pair, so as to hold the filter cloth against the associated plate member of the lower filter element.

The spoke portions are of substantially strip-shaped configuration, resembling a strip that stands on edge. They may be of one piece with the ring portion, being welded thereto or cast in one piece therewith, they may be injection molded with the ring portion or otherwise secured thereto. However, they may also be entirely separate from the ring portion, in which case the spoke portions are advantageously connected in suitable manner with one another. The spoke portions may be straight or they may be curved, and they may be perforate or imperforate. If perforation is chosen, additional turbulence in the back-flushing liquid can be obtained, without any decrease in the stability of the filter element package that is mounted on the shaft, so that thereby an improvement in the cleaning of the filter cloth is obtained.

The ring portion and/or the spoke portions may be of metallic material or of synthetic plastic material, for instance steel or nylon, to name two examples. The choice of the material will usually depend upon the type of medium that is to be filtered.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Referring firstly to the Figures in general it is pointed out that the back-flushing operation is carried out in conventional manner — for details reference may be had to my aforementioned U.S. patent and Swiss patent — by admitting into the receptacle surrounding the shaft and the filter elements (which receptacle is not shown, since it is known from the aforementioned patents) a back-flushing liquid after the filter cake has been centrifugally ejected from the filter cloth of the filter elements, and has been removed. The receptacle is then more or less filled and as the filter elements rotate at relatively high speed in the back-flushing liquid in the receptacle, the liquid is forced through the filter cloth in order to obtain the desired back flushing. Of course, it is conceivable to force liquid under pressure between the filter cloth and the plate members of the respective filter elements, from the interior of the hollow shaft.

In any case, insofar as FIGS. 1 and 2 and 1*a* and 2*a* are concerned, it should be understood that the upright hollow shaft shown in each of these Figures, and the filter elements which are also shown, are circular and that while only one-half of the shaft and of the filter elements is shown in each of the Figures, the other half should be understood to be identical to the one shown, but mirror-symmetrical relative thereto.

Figure 1:
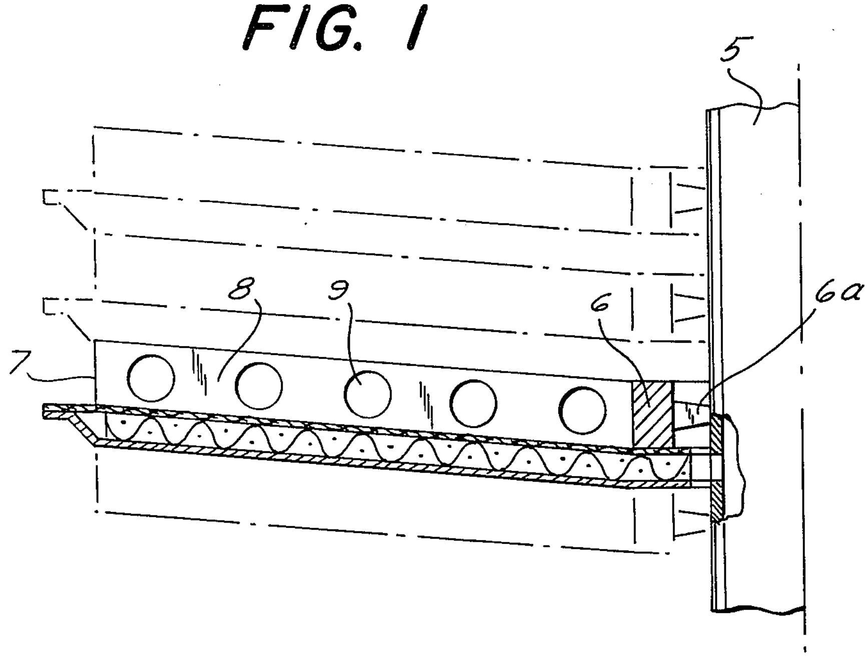
FIG. 1 is a fragmentary vertical section through a portion of an upright hollow shaft and portions of some filter elements mounted on the latter.

Referring now specifically to FIG. 1 it will be seen that reference numeral 5 identifies an upright hollow shaft which is provided in its circumference with a plurality of perforations 5' as illustrated. The shaft carries on it a plurality of plate-shaped substantially horizontally oriented filter elements 1 which are mounted on the shaft 5 for rotation with the same, as indicated by the arrow. Each of the filter elements 1 is composed in known manner of a liquid-impermeable filter plate member 4 on which there is disposed a liquid-permeable intermediate layer 3, for instance a wire mesh or the like, and on top of which there is located a filter cloth 2 which of course is also permeable to liquid.

Figure 2:
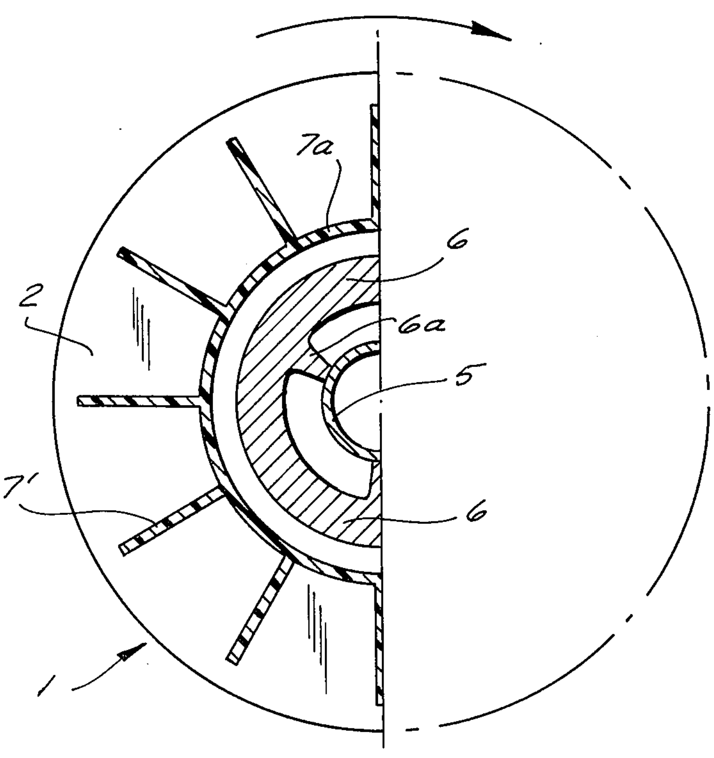
FIG. 2 is a partly sectioned plan view of a portion of the upright hollow shaft, illustrating another embodiment of the invention.
Figure 3:
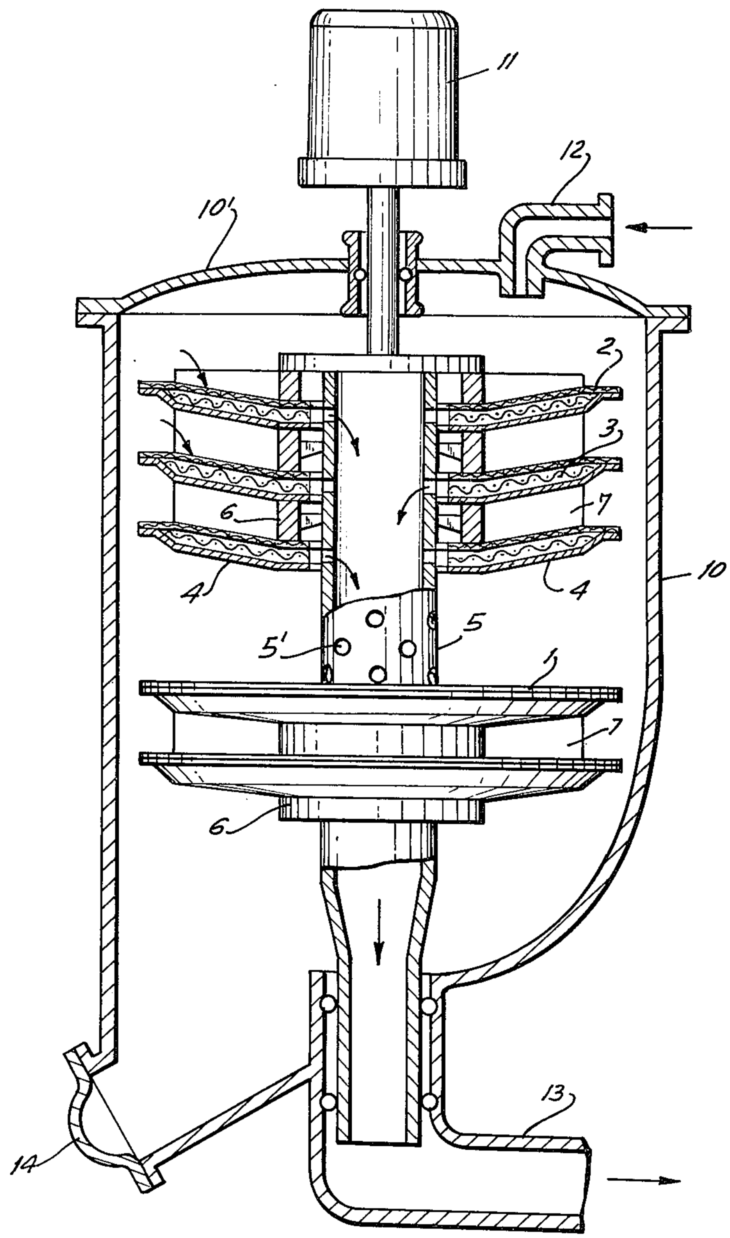
FIG. 3 is a vertical section through the whole filter apparatus.

FIG. 2 illustrates in a vertical cross section the complete filter apparatus in which the above-described filter arrangement is used. As shown therein, the apparatus comprises a receptacle 10 closed at the upper end thereof by cover 10' in which an inlet 12 for the fluid to be filtered is provided. The upright hollow shaft 5 is extended upwardly by a solid shaft portion which projects through a bearing provided in the cover and which is connected to drive means 11, here shown as an electric motor for rotating the hollow shaft 5. The lower end of the hollow shaft is likewise rotatably mounted in a bearing as schematically shown in FIG. 3 in which proper sealing means are provided to extend in an outlet 13 for filtered fluid so that the outlet 13 communicates with the interior of the upright hollow shaft at the lower end of the latter. The plurality of filter elements 1 are mounted on the shaft axially spaced from each other and as described above, each of the filter elements includes a plate member 4 and a filter cloth 2 overlying and upwardly facing the side of the plate member and defining therewith a space communicating with the interior of the hollow shaft through openings 5'. Spacing means 6 and 7 are located between each pair of adjacent filter elements and these spacing means include a ring portion 6 surrounding the shaft 5 and a plurality of spoke portions 7 projecting outwardly from the ring portion and having each an upper edge engaging a downwardly facing side of the plate member and a lower edge engaging the filter cloth on the lower filter of the pair so as to hold the filter cloth against the associated plate member of the following filter element. The receptacle 10 is further provided at the lower end with a laterally extending outlet opening 14 usually closed by a cover for discharging solid particles from the interior of the receptacle which have been filtered out from the fluid.

When the liquid to be filtered is admitted into the vessel accommodating this arrangement, and a pressure differential exists between the interior of the vessel and the interior of the hollow shaft 5, then the liquid will pass through the filter cloth 2 of the respective filter element 1, and run off on the filter plate member 4 and pass through the associated opening or openings 5' into the interior of the shaft 5. The solids to be removed are retained on the upper surface of the respective filter cloth 2. Subsequent rotation of the shaft 5 causes the retained solids to be centrifugally flung off to a large extent. However, since there will always be solids still retained in the filter cloth, these must be removed by back flushing, as previously pointed out. In order to prevent the filter cloth from being lifted off the intermediate layer 3 and the associated filter plate member 4, the arrangement according to the present invention is provided. A spacer ring 6 surrounds the shaft 5 and may be provided with inwardly extending projections 6*a* which engage the shaft. Spoke portions 7 resembling strip material standing on edge are provided, which in the embodiment of FIG. 1 are of one piece with the metallic spacer ring 6 and extend radially outwardly therefrom. The spoke portions 7 have upper edges which engage the underside of the respectively upper filter plate member 4, and lower edges which engage the upwardly directed surface of the filter cloth 2 of the filter element 1 that is located beneath the upper filter plate member 4. In FIG. 1 the spoke portions 7 are provided with a plurality of perforations or holes 9 which extend between the major surfaces 8, so that during back-flushing liquid can pass through them and additional turbulence can thereby be obtained, which aids in the cleaning of the filter cloth 2.

Figure 1A:
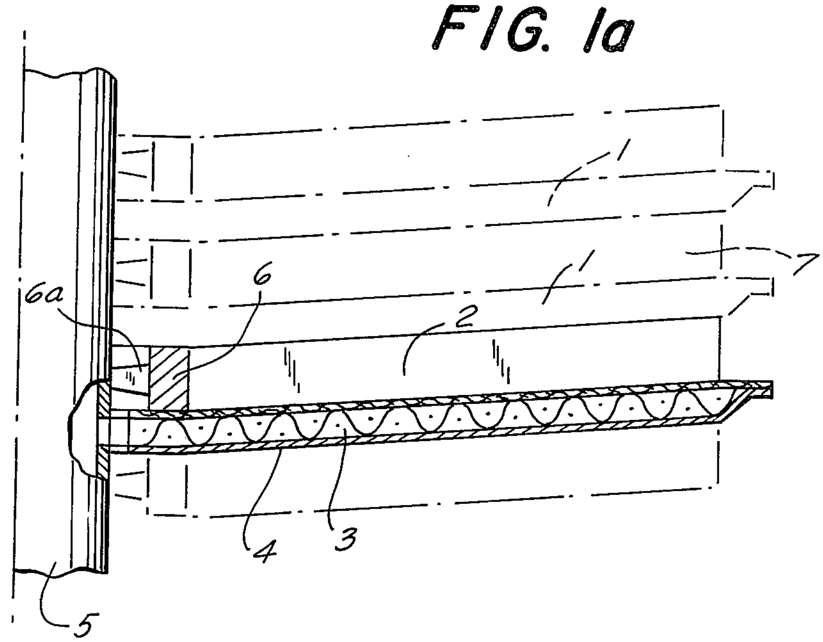
FIG. 1*a* is a view analogous to FIG. 1, showing a slightly modified embodiment.

The embodiment in FIG. 1*a* is almost identical with that of FIG. 1, and like reference numerals identify like elements. The only difference in the embodiment of FIG. 1*a* over that of FIG. 1 is that the spoke portions 7 are not provided with the holes 9.

The embodiment in FIG. 2 is also largely the same as that in FIG. 1, and like reference numerals again identify like elements. FIG. 2 differs from FIG. 1 and FIG. 1*a* in that the spoke portions 7' are not connected with the spacer ring 6, but are instead entirely separate from the same. They are connected with one another by an upstanding circular web 7*a*. The spoke portions 7' and the web 7*a* in this embodiment are of one piece with one another, being of a synthetic plastic material and being for example injection molded or the like. Of course, the spoke portions 7 and the ring 6 of FIGS. 1 and 1*a* could also be of synthetic plastic material, instead of metal as shown.

Figure 2A:
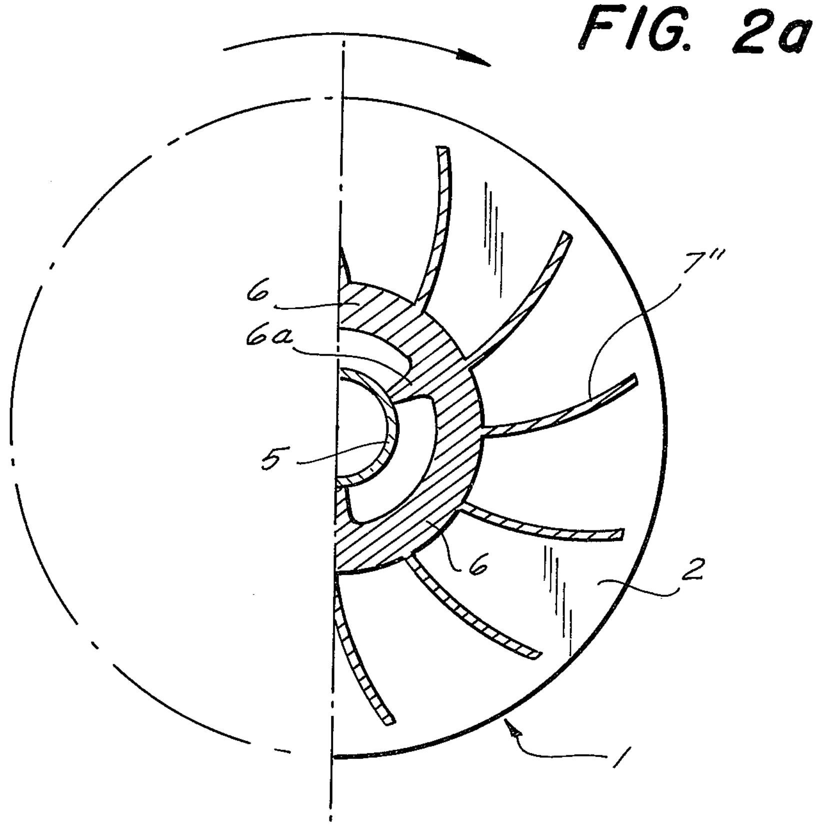
FIG. 2*a* is analogous to FIG. 2 but illustrating a slightly different embodiment.

FIG. 2*a* differs from FIG. 2 only in that it shows that the spoke portions 7'', which here are of metal and of one piece with the spacer ring 6, can also be curved analogous to the blades of a turbine. Of course, in FIG. 2 as well as in FIG. 2*a* the spoke portions 7' or 7'' may be either provided with the holes 9 of FIG. 1, or they may be imperforate as in FIG. 1*a*.

It will be appreciated that during the back-flushing operation any forces tending to lift the respective filter cloth 2 off the filter plate member 4 of the respective filter element 1, will merely succeed in pressing the filter cloth against the downwardly facing edges of the respective spoke portions 7, 7' or 7'', which latter in turn transmit the forces to the solid cross-section filter plate member 4 of the filter element 1 that is located above them. This prevents the undesired lifting and deformation of the filter cloth 2, and further provides for an improved stability of the entire package of filter elements 1 on the shaft 5. Despite this increased stability the entire system is, however, sufficiently elastic to compensate for the stresses which arise during the operation.

It will be understood that each of the elements described above, or two or more together, may also find a useful application in other types of constructions differing from the types described above.

While the invention has been illustrated and described as embodied in a centrifugal filter apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a filter apparatus, a combination comprising a receptacle having an inlet for fluid to be filtered; an upright hollow shaft rotatably mounted in said receptacle; drive means connected to said shaft for rotating the same; a plurality of filter elements mounted on said shaft axially spaced from each other, each of said filter elements including a plate member and a filter cloth overlying an upwardly facing side of said plate member defining therewith a space communicating with the interior of said hollow shaft; outlet means for filtered fluid in said receptacle communicating with the interior of said upright hollow shaft at the lower end of the latter; and spacing means located between each pair of adjacent filter elements and including a ring portion surrounding said shaft and a plurality of spoke portions projecting outwardly from said ring portion and each having an upper edge engaging a downwardly facing said side of the plate member, and a lower edge engaging the filter cloth on the lower filter of the pair, so as to hold said filter cloth against the associated plate member of said lower filter element.

2. A combination as defined in claim 1, wherein said spoke portions resemble strips standing on edge.

3. A combination as defined in claim 1, wherein said spoke portions are straight and extend radially from said ring portion.

4. A combination as defined in claim 1, wherein said spoke portions are curved in circumferential direction of said shaft.

5. A combination as defined in claim 2, wherein said spoke portions are imperforate.

6. A combination as defined in claim 2, wherein said spoke portions are perforated.

7. A combination as defined in claim 1, wherein said spoke portions are fixedly connected with said ring portion.

8. A combination as defined in claim 1, wherein said spoke portions are separate from said ring portion.

9. A combination as defined in claim 1, wherein at least said spoke portions are of metallic material.

10. A combination as defined in claim 1, wherein at least said spoke portions are of synthetic plastic material.

* * * * *